United States Patent
Feng

[11] Patent Number: 5,898,584
[45] Date of Patent: Apr. 27, 1999

[54] CIRCUIT FOR SUPPLYING POWER TO CEILING FAN

[75] Inventor: Tao-Tang Feng, Taichung Hsien, Taiwan

[73] Assignee: Rhine Electronic Co. Ltd., Taichung Hsiang, Taiwan

[21] Appl. No.: 09/046,495

[22] Filed: Mar. 23, 1998

[51] Int. Cl.⁶ .............................. H02M 7/00; H02M 7/217
[52] U.S. Cl. ............................................ 363/125; 363/127
[58] Field of Search .................................. 363/44, 45, 52, 363/53, 84, 89, 125, 127

[56] References Cited

U.S. PATENT DOCUMENTS 3,909,700  9/1975  Ferro ........................................ 363/125
5,587,895  12/1996  Harkins ..................................... 363/127
5,774,350  6/1998  Notaro et al. ............................. 363/127

*Primary Examiner*—Matthew Nguyen
*Attorney, Agent, or Firm*—Kolisch Hartwell Dickinson McCormack & Heuser

[57] ABSTRACT

Disclosed is a power supplying circuit for a ceiling fan including a protecting unit, a power supplying unit and a rectifying unit. An operation of the power supplying circuit is divided into four cases which are a negative half cycle loop, a positive half cycle loop, a control loop and a protection loop. Using this power supplying circuit, a stable DC voltage output can be achieved for both a control purpose and a detection purpose when a load being in a series connection with the power supplying circuit varies from a low load to a high load.

3 Claims, 1 Drawing Sheet

5,898,584

CIRCUIT FOR SUPPLYING POWER TO CEILING FAN

BACKGROUND OF THE INVENTION

The present invention relates to a power supplying circuit, and more particularly to a power supplying circuit for a ceiling fan.

Most electrical devices have equipped with a power supplying circuit for providing a required electrical power. There are many different techniques for designing the power supplying circuits used in various electrical applications. Generally, since many components in the electrical devices are damaged due to receiving an unstable power supply, it is necessary to achieve a stable output when designing a power supplying circuit for these electrical devices. Therefore, the present invention discloses a power supplying circuit for a ceiling fan, in which a stable DC voltage output and a feature of lowering the production cost can be both achieved.

SUMMARY OF THE INVENTION

The present invention is directed to a power supplying circuit for a ceiling fan.

An objective of the present invention is to provide a power supplying circuit for a ceiling fan so that a stable DC voltage output can be extracted therefrom for a control or detection purpose.

In accordance with one aspect of the invention, there is provided a power supplying circuit for a ceiling fan, including a protecting unit in which a positive terminal of an alternating-current (AC) input source is connected to a first diode and a silicon controlled rectifier (SCR) being parallel connected together and then connected with a primary side of a transformer being connected to a negative terminal of the AC input source, a load is in a series connection between the AC input source and the first diode or the primary side of the transformer, and a first resistor and a first capacitor being parallel connected together are coupled to a first Zener diode and a connection point therebetween is connected to a gate of the SCR, a power supplying unit in which an N node of a local diode is connected to a drain of an N channel depletion type of metal-oxide semiconductor field effect transistor (NMOSFET) and a P node of the diode is connected to a source of the NMOSFET, a series connection of a second resistor and a second Zener diode is connected to the drain of the NMOSFET through a second diode, and a third resistor, a second capacitor and a third Zener diode being in a parallel connection form are connected to the series connection of the second resistor and the second Zener diode and a connection point therebetween is coupled to a gate of the NMOSFET, and the gate of the NMOSFET is connected with the drain thereof and the power supplying unit is connected to the protection unit at two junction points, and a rectifying unit for rectifying the current induced on a secondary side of the transformer, wherein input terminals of the rectifying unit are connected to the secondary side of the transformer and an output terminal thereof is connected to an output terminal of the power supplying unit at an output terminal of the power supplying circuit, whereby a stable direct current (DC) output is extracted from the output terminal of the power supplying circuit for control and detection purposes when the value of the current passing through the load being in a series connection with the power supplying circuit varies from milliamperes to several amperes or even more.

In accordance with another aspect of the invention, there is provided a power supplying circuit for a ceiling fan, further comprising a capacitor for extracting a stable DC voltage output corresponding to the stable DC current for a control or a detection purpose.

BRIEF DESCRIPTION OF THE DRAWINGS

The above objective, other features and advantages of the present invention will become more apparent by describing in detail the preferred embodiment thereof with reference to the attached drawing, in which:

The Figure is a detailed circuit diagram of a power supplying circuit for a ceiling fan in accordance with the present invention.

DETAILED DESCRIPTION OF THE PREFERRED EMBODIMENT

Figure 1:
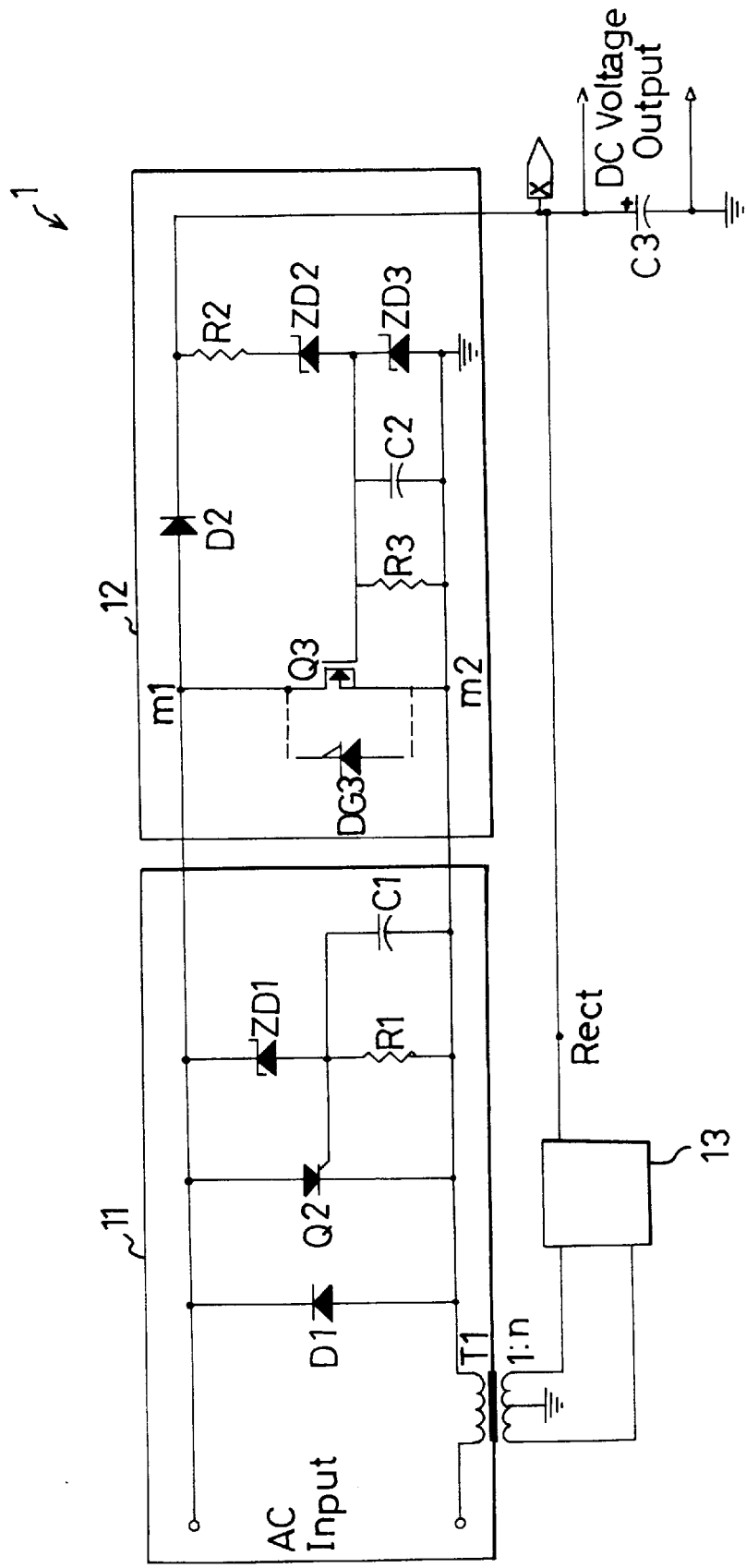

The Figure shows a detailed circuit diagram of a power supplying circuit 1 for a ceiling fan in accordance with the present invention. This power supplying circuit 1 is divided into a protecting unit 11, a power supplying unit 12 and a rectifying unit 13. In the protecting unit 11, a positive terminal of an alternating-current (AC) input source is connected to a first diode D1 and a silicon controlled rectifier (SCR) Q2 which are parallel connected and then connected with a primary side of a transformer T1 being connected to a negative terminal of the AC input source. A load RL is in a series connection either between the AC input source and the first diode D1 or between the AC input source and the primary side of the transformer T1. A first resistor R1 and a first capacitor C1 being parallel connected are coupled to a first Zener diode ZD1, in which a connection point between the parallel connection of the first resistor R1 and the first capacitor C1 and the first Zener diode ZD1 is connected to a gate of the SCR Q2.

In the power supplying unit 12, an N node of a diode DQ3 is connected to a drain of an N channel depletion type of metal-oxide semiconductor field effect transistor (NMOSFET) Q3 and a P node of the diode DQ3 is connected to a source of the NMOSFET Q3. A series connection of a second resistor R2 and a second Zener diode ZD2 is connected to the drain of the NMOSFET Q3 through a second diode D2. A third resistor R3, a second capacitor C2 and a third Zener diode ZD3 being in a parallel connection form are connected to the series connection of the second resistor R2 and the second Zener diode ZD2 and a connection point therebetween is coupled to a gate of the NMOSFET Q3. A base of the NMOSFET Q3 is connected with the drain thereof. The protecting unit 11 is connected to the power supplying unit 12 at a point m1 and a point m2, respectively.

In the rectifying unit 13, An input terminal of the rectifying unit 13 is connected to a secondary side of the transformer T1 and an output terminal of the rectifying unit 13 is connected to an output terminal of the power supplying unit 12 at an output terminal of the power supplying circuit 1.

An operation of the power supplying circuit 1 is divided into four cases and they are respectively described as follows.

The first case is a negative half cycle loop. In this case, an AC current passes through the load RL, the diode D1 or DQ3, and the primary side of the transformer T1 to form a loop during a negative half cycle of the AC current. A higher voltage is induced at the secondary side of the transformer T1. The value of the voltage or the current corresponding to the voltage varies depending on the type of the load, for example, a low load or a high load, and a result is transmitted to an output terminal X of the power supplying circuit 1 through the rectifying unit 13.

The second case is a positive half cycle loop. In this case, the AC current passes through the load RL and a result is transmitted to the output terminal X described above after being rectified by the second diode D2 during a positive half cycle of the AC current. The positive half cycle loop generates a result incorporated with the result generated in the negative half cycle loop are both transmitted to the output terminal X which is further connected to a third capacitor C3 to form a DC voltage output thereon.

The third case is a control loop. The control loop is subdivided into two cases which are a low load control loop and a high load control loop. In the low load control loop, the AC current passes through the second diode D2 and then the NMOSFET Q3 is conducted when the voltage of the positive half cycle of the AC current is higher than the voltage on the second Zener diode ZD2 so that it is almost short-circuited between the point m1 and the point m2. Meanwhile, the AC current no longer passes through the second diode D2 but instead a path is directly formed by the NMOSFET Q3. However, the value of the voltage at the terminal X is about $V_{ZD2}+2$ while the AC voltage is induced at the secondary side of the transformer T1. The rectifying unit 13 can not be driven since the induced voltage at the secondary side of the transformer T1 is too low. In other words, the DC voltage output on the third capacitor C3 of the power supplying circuit 1 is supplied by the second diode D2 and controlled by the NMOSFET Q3 during the light load case. In the high load control loop, the output voltage of the transformer T1 is gradually increased when the load current is gradually increased, and the second diode D2 stops operating when the voltage corresponding to the current passing through the rectifying unit 13 is greater than or equal to the voltage on the second diode D2. At the same time, this current is fed into the gate of the NMOSFET Q3 to make the NMOSFET Q3 become conducted so that it is almost short-circuited between the point m1 and the point m2, that is, the voltage at the output terminal x is supplied by the transformer T1.

The fourth case is a protection loop. The protection loop is to prevent the NMOSFET Q3 having a low voltage-bearing characteristic from being possibly damaged during a high potential corresponding to a positive half cycle of the AC current when loading and $V_{ZD1}<Q3V_{DS}$ in the meantime. The SCR Q2 is driven to be conducted in advance when the NMQSFET Q3 has not reached its breakdown voltage yet so as to reduce the voltages at the points m1 and m2 for achieving a purpose of protecting Q3. In addition, the overvoltage protection in the negative half cycle is achieved by the first diode D1 being conducted during the negative half cycle so that the SCR Q2 and NMOSFET Q3 are protected during the negative half cycle since the diode DQ3 included in the NMOSFET Q3 is a high-current diode with a low internal resistance. Therefore, the first diode D1 can be a diode with a low current value.

Accordingly, a stable DC voltage output can be extracted without having the load nearly affected in a series load connection loop. Furthermore, some high-voltage, high-current and extremely expensive parts are replaced by low-cost low-voltage high-current NMOSFETs and low-cost high-voltage low-current SCRs and they can accurately operate with very small driving power to achieve a protection effect.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A power supplying circuit for a ceiling fan, comprising:

a protecting unit wherein a positive terminal of an alternating-current (AC) input source is connected to a first diode and a silicon controlled rectified (SCR) being parallel connected together and then connected with a primary side of a transformer being connected to a negative terminal of the AC input source, a load is in a series connection with the AC input source, and a first resister and a first capacitor being parallel connected together are coupled to a first Zener diode and a connection point therebetween is connected to a gate of the SCR;

a power supplying unit wherein an N node of a local diode is connected to a drain of an N channel depletion type of metal-oxide semiconductor field effect transistor (NMOSFET) and a P node of the diode is connected to a source of the NMOSFET, a series connection of a second resistor and a second Zener diode is connected to the drain of the NMOSFET through a second diode, and a third resistor, a second capacitor and a third Zener diode being in a parallel connection form are connected to the series connection of the second resistor and the second Zener diode and a connection point therebetween is coupled to a gate of the NMOSFET, and the gate of the NMOSFET is connected with the drain thereof and said power supplying unit is connected to said protecting unit at two junction points; and a rectifying unit for rectifying the current induced on a secondary side of the transformer, wherein input terminals of said rectifying unit are connected to the secondary side of the transformer and an output terminal thereof is connected to an output terminal of said power supplying unit at an output terminal of the power supplying circuit, whereby a stable direct current (DC) output is extracted from the output terminal of the power supplying circuit for control and detection purposes when the value of the current passing through the load being in a series connection with the power supplying circuit varies from milliamperes to several amperes.

2. The power supplying circuit as claimed in claim 1, further comprising a capacitor for extracting a stable DC voltage output corresponding to the stable DC current for a control purpose.

3. The power supplying circuit as claimed in claim 1, further comprising a capacitor for extracting a stable DC voltage output corresponding to the stable DC current for a detection purpose.

* * * * *